UNITED STATES PATENT OFFICE.

THEODOR GOTTLIEB BENNO GOLDMANN, OF BERLIN, GERMANY, ASSIGNOR TO ALB. MAGDOLF, OF SAME PLACE.

PROCESS OF MAKING ARTICLES FROM HOMOGENEOUS PLASTIC COMPOSITIONS.

SPECIFICATION forming part of Letters Patent No. 561,938, dated June 9, 1896.

Application filed March 5, 1896. Serial No. 581,982. (No specimens.)

*To all whom it may concern:*

Be it known that I, THEODOR GOTTLIEB BENNO GOLDMANN, a subject of the King of Prussia, German Emperor, residing at Berlin, Kingdom of Prussia, Germany, have invented certain new and useful Improvements in a Process of Making Homogeneous Articles from Plastic Compositions, of which the following is a specification.

This invention relates to an improved process of preparing plastic composition for making pressed articles of all kinds. All such plastic compositions used for pressing objects are composed of filling material and binding substances. A number of compositions of various kinds were heretofore proposed for pressing articles of use, in which gums or other binding substances—such as casein, albumin, &c.—were used, while the filling materials were composed of cellulose, wood-pulp, sawdust, ground nut-shells, or other moisture-absorbing materials. These and other similar plastic compositions which were heretofore used have the great disadvantage that owing to their mixture they are not homogeneous throughout and are not mixed in the proper proportions, so that the objects which are pressed from the same have an unequal and imperfect appearance.

A very homogeneous plastic composition in which there is the proper proportion between the binding substance and filling material, so that a large number of articles can be pressed from the same, is obtained when binding substances such as shellac, copal-lac, dammar gum, sandarac, elemi, mastic, benzoin, or amber, and as filling materials absolutely water-resisting bodies—such as, for instance, pulverized chalk, kaolin, flint, glass, infusorial earth, burnt or unburnt clay powder, slate, or other minerals—are used, and in which the mixture is made according to the following process:

The following substances—such as, for instance, dry gums—are dissolved in alcoholoids or the products obtained therefrom—such as ether or chloroform—that is to say, in water-soluble solvents. The finely-ground filling material is mixed with the alcoholic solution of the gum, in which the proportion of the mixture is determined by the specific weight of the binding substance and filling material, both determined in dry state, so that when the specific weight of the binding substance in dry state is equal to one, and the specific weight of the filling material in dry state is equal to two and one-half, then one part of the binding substance has to be mixed with two and one-half parts of the filling material.

The solution of the binding substance and filling material takes place under continuous stirring in suitable mixing devices. When pigments or dyestuffs are used for imparting the required color to the plastic composition, then the pigment or dyestuff is to be considered, according to its specific weight in relation to the binding substance, as dry filling material and added thereto in fixing the proper proportions of the same.

If the mixture of the binding substance and filling material is properly accomplished in proportion to their specific weight in dry state, as described, then water is added to the mixture under continuous stirring until the binding substance and the filling material separate from the solvent—for instance, alcohol. The addition of water to the mixture of binding substance and filling material has a double purpose: First, without the addition of water the filling material would have to be treated two or three times with the binding solution, dried previous to each manipulation, and then pulverized again, for the reason that when the entire gum solution which is used as the binding substance is added once the mass assumes the form of a thick paste, which can never be dried entirely; second, without the addition of water the drying, even in mixing the parts two or three times, takes place much slower, as the plastic composition formed with the gum solution is of a paste-like consistency, which consistency is entirely removed when the mass is precipitated by the water from the solvent. The mere mechanical mixture of the finely-pulverized binding substance with the filling material produces in all cases only a product of inferior quality, both as to durability and permanency.

The precipitate is composed of finely-divided binding substance—for instance, shellac and filling material, with or without pigment, which are intimately united and form a thick paste in the water—while the solvent—for instance, alcohol—is dissolved in the water—that is to say, the binding substance is, during its separation from the solvent, not separated from the filling material. The thus-obtained pasty mass is next removed from the water into which the solvent has gone into solution, pressed, and any water and solvent still contained in the same thus removed, after which a perfect drying and fine pulverizing of the plastic mass is accomplished and the latter then used as the material from which the pressed articles are made. The pulverized mass, which is throughout a homogeneous composition, is then placed in heated molds, with or without previously heating the same, and then pressed in the usual manner into objects of all kinds. It is necessary that the pressed molds be heated to such an extent that the melting of the finely-divided and distributed binding substance takes place simultaneously with its intimate union with the filling material. The thus-obtained pulverized mass can be used for the manufacture of buttons, cane and umbrella handles, door-knobs, insulating bodies for electric purposes, and generally as a substitute for hard rubber, horn, stone-nut, &c.

Having thus described my invention, I claim as new and desire to secure by Letters Patent—

1. The process herein described of preparing homogeneous plastic compositions from a binding substance and filling material, which consists, first, in dissolving the binding substance in a water-soluble solvent, such as alcohol, next thoroughly mixing the solution of the binding substance with the finely-pulverized filling material in certain proportions, then adding water to the plastic mass, under continuous stirring, until the solvent of the binding substance separates from the mass and the latter is deposited as a thick paste from the water containing the solvent, removing the water from the mass, and next drying and pulverizing the same, substantially as set forth.

2. The process herein described of making pressed articles from plastic compositions, which consists in dissolving a binding substance in a water-soluble solvent, such as alcohol, then mixing the binding substance and a filling material and pigment in finely-divided state, in proportion to their specific weights in dry state, intimately together, next adding water to this mixture, under continuous stirring until the intimately-mixed mass of binding substance and filling material is separated from the solvent and precipitated as a thick paste, next removing the water from and drying the paste, pulverizing the same, and compressing the same, while subjected to heat, substantially as set forth.

In witness whereof I have hereunto set my hand in presence of two witnesses.

THEODOR GOTTLIEB BENNO GOLDMANN.

Witnesses:
   W. HAUPT,
   G. WILLNER.